United States Patent
Campagnolle et al.

(10) Patent No.: US 7,175,029 B2
(45) Date of Patent: Feb. 13, 2007

(54) MAIL SORTING MACHINE COMPRISING A BLOWER BETWEEN A SYSTEM FOR THE INJECTION OF MAIL ARTICLES AND AN INJECTION CAROUSEL

(75) Inventors: Pierre Campagnolle, Beaumont les Valence (FR); Emmanuel Delbe, Guilherand (FR)

(73) Assignee: Solystic, Gentilly (FR)

( * ) Notice: Subject to any disclaimer, the term of this patent is extended or adjusted under 35 U.S.C. 154(b) by 108 days.

(21) Appl. No.: 10/519,751

(22) PCT Filed: Nov. 4, 2004

(86) PCT No.: PCT/FR2004/050566

§ 371 (c)(1),
(2), (4) Date: Dec. 29, 2004

(87) PCT Pub. No.: WO2005/063599

PCT Pub. Date: Jul. 14, 2005

(65) Prior Publication Data

US 2006/0011522 A1    Jan. 19, 2006

(30) Foreign Application Priority Data

Dec. 24, 2003    (FR) .................................. 03 51201

(51) Int. Cl.
*B07C 5/00*    (2006.01)
*B65H 5/22*    (2006.01)
(52) U.S. Cl. ...................... 209/644; 209/584; 209/900
(58) Field of Classification Search ................ 209/584, 209/900, 922, 932, 644, 623; 271/2, 72, 271/211, 220, 314; 198/370.01, 370.03, 198/370.05
See application file for complete search history.

(56) References Cited

U.S. PATENT DOCUMENTS

| | | | | |
|---|---|---|---|---|
| 3,125,230 A | * | 3/1964 | Edmunds et al. | 198/349.5 |
| 3,199,673 A | * | 8/1965 | Flint | 209/644 |
| 4,311,229 A | * | 1/1982 | Bennett | 198/457.05 |
| 5,360,316 A | | 11/1994 | O'Mara | |
| 5,984,303 A | | 11/1999 | Aoyagi | |
| 5,989,122 A | * | 11/1999 | Roblejo | 463/22 |

(Continued)

FOREIGN PATENT DOCUMENTS

EP    0 820 818 A1    1/1998

(Continued)

OTHER PUBLICATIONS

U.S. Appl. No. 10/519,752, filed Dec. 29, 2004, entitled "A Postal Sorting Machine Including an Injection Carousel Fitted with Flexible Deflectors".

*Primary Examiner*—Joseph C. Rodriguez
(74) *Attorney, Agent, or Firm*—Sughrue Mion, PLLC

(57) ABSTRACT

A postal sorting machine comprises an injection carousel (1) and a system (4) for injecting mail items (3) standing on edge into receptacles (2) of the carousel (1). Each receptacle (2) of the carousel (1) is defined by an end wall (7) and two side walls (5, 6). A blower (13) is interposed between the injection system (4) and the carousel (1). The blower (13) delivers two jets (14, 15) of compressed air that are substantially perpendicular to each other, with each mail item (3) being displaced between the jets.

5 Claims, 2 Drawing Sheets

U.S. PATENT DOCUMENTS 6,644,461 B1 * 11/2003 Imbert et al. ............ 198/419.2
2002/0017481 A1 * 2/2002 Johnson et al. ............ 209/547

FOREIGN PATENT DOCUMENTS

| FR | 2 795 396 | 12/2000 |
| FR | 2 795 396 A | 12/2000 |
| GB | 1 022 824 A | 3/1966 |

* cited by examiner

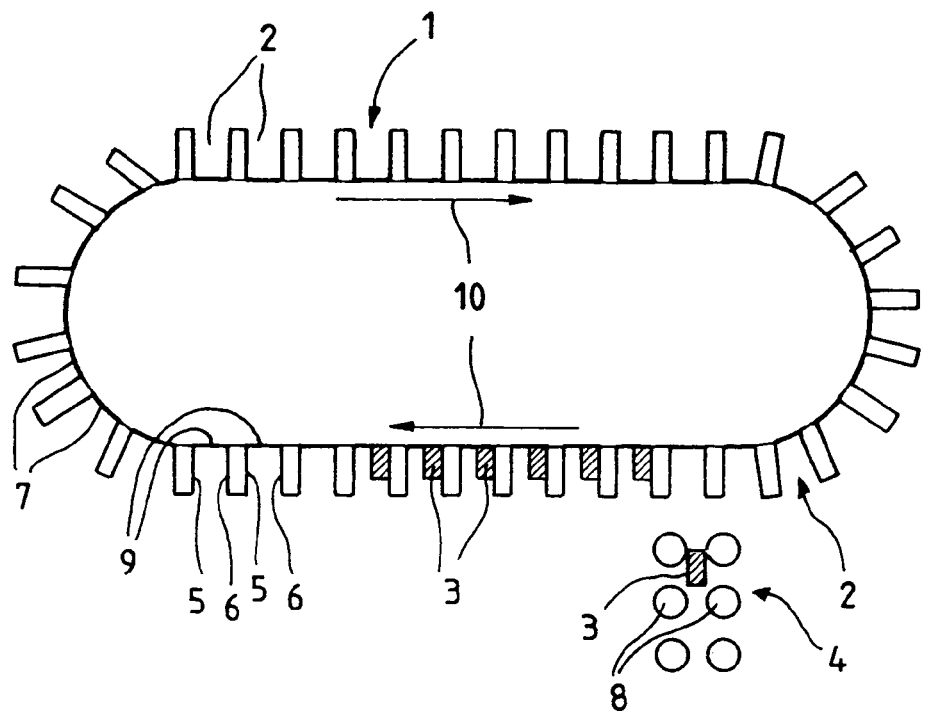
FIG_1
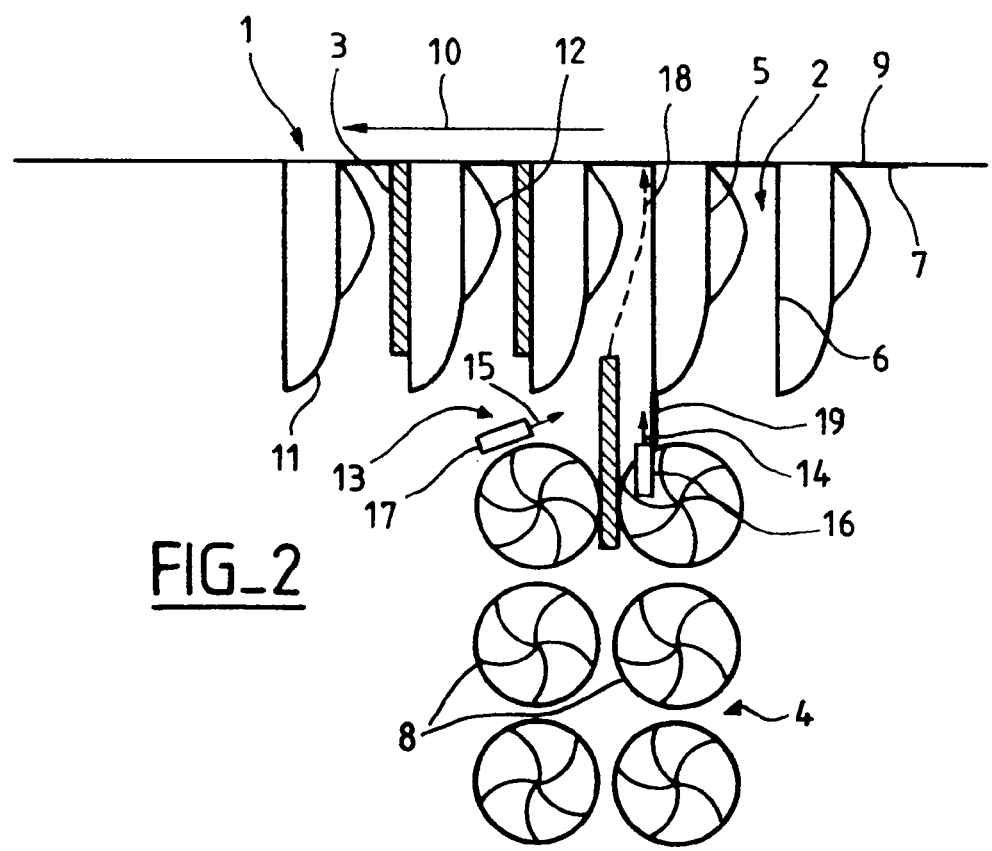
FIG_2

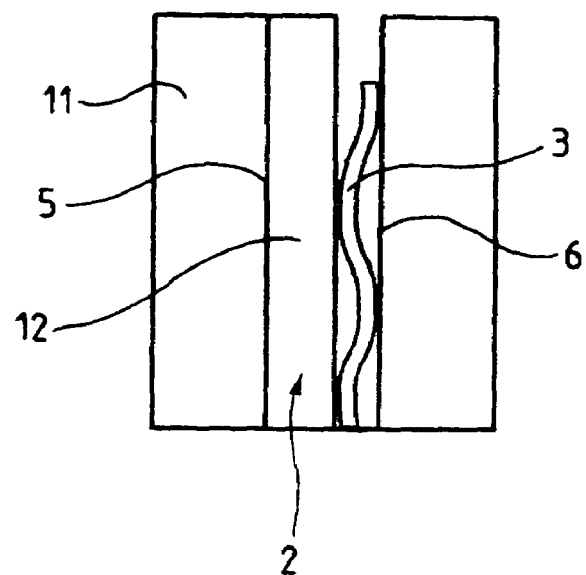
FIG_3
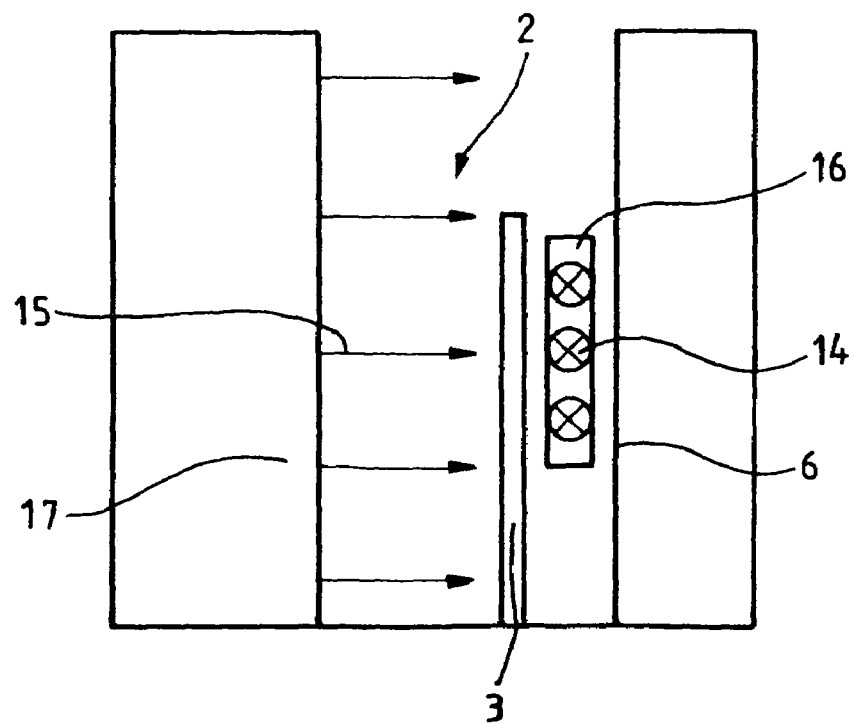
FIG_4

MAIL SORTING MACHINE COMPRISING A BLOWER BETWEEN A SYSTEM FOR THE INJECTION OF MAIL ARTICLES AND AN INJECTION CAROUSEL

BACKGROUND OF THE INVENTION

The invention relates to a postal sorting machine comprising a postal sorting machine comprising a carousel and a system for injecting mail items edge on into receptacles of the carousel, each receptacle of the carousel being defined by an end wall and two side walls.

In a postal sorting machine, and more particularly in a type "TOP 2000" machine manufactured by the supplier "Solystic", mail items traveling on an inlet conveyor are injected into a sorting conveyor by means of an intermediate injection carousel. This operation of transferring mail items is particularly critical for the performance of the sorting machine. It determines the speed at which mail items are processed by the sorting machine, so the items must be transferred in minimum time and at an injection rate into the carousel of about six items per second.

The mail items processed by that machine are mainly flat objects of all kinds that can be rigid, flexible, plasticized, made of paper, of width lying in the range 90 millimeters (mm) to 300 mm, of length lying in the range 140 mm to 400 mm, and of thickness lying in the range 0.2 mm to 32 mm.

A postal sorting machine of the kind described above is disclosed in patent document FR-2 795 396. In that prior device, mail items are conveyed standing on edge between two rows of wheels constituting the injection system, and at the outlet they are sent from the rows of wheels into receptacles of the carousel. That injection system enables the speed at which mail items are injected into the receptacles to be adjusted. The mail items are moved standing on edge in the receptacles of the carousel, prior to falling vertically, under gravity, edge-on into slots of a sorting conveyor synchronized with the carousel.

The use of such a system for injecting mail items into the receptacles of the carousel is satisfactory only for mail items that are rigid, heavy, and large in size.

Flexible mail items tend to sag between the walls of the receptacle. In addition, sending items at high speed into the receptacles of the carousel causes items that are not very rigid to become deformed under the effects of friction generated by the speed and by impacts against the walls. Finally, the stirring of the air, due to the carousel rotating and to air being compressed by variation in the spacing between the walls of the receptacles as the carousel rotates, leads to disturbances of the ambient air in the item injection zone, thereby changing the trajectories of certain lightweight mail items.

The deformation of mail items and the changes to their trajectories on being injected into the receptacles of the carousel are the main causes of machines being stopped and of mail items being rejected from the sorting conveyor, thereby slowing down operation of the sorting machine and requiring operators to intervene.

A mail item that is poorly injected into a receptacle of the carousel, i.e. that is not standing on its edge at the end of the receptacle corresponding to its entry position, does not drop vertically straight into the corresponding slot of the sorting conveyor, but spreads out flat, e.g. over the surfaces of a plurality of slots, or falls into another slot together with another mail item. Mail items that are badly inserted into the slots of the sorting conveyor are detected and rejected, or else they are removed using an ejection brush, when the articles lie over a plurality of slots.

Those injection problems lead to a high ratio of mail items being absent from the slots of the sorting conveyor, which items need to be processed manually.

The device for injecting mail items from the inlet conveyor to the intermediate carousel as described above does not come up to the expectations by users of postal sorting machines, since up to 2% of mail items are injected badly.

SUMMARY OF THE INVENTION

The object of the invention is to remedy the drawbacks described above by proposing a postal sorting machine in which improved means are provided for bringing mail items in a straight vertical position at the ends of the receptacles of the carousel and for maintaining them in that position.

To this end, the invention provides a postal sorting machine comprising a carousel and a system for injecting mail items edge on into receptacles of the carousel, each receptacle of the carousel being defined by an end wall and two side walls, the machine being characterized in that a blower is interposed between the injection system and the carousel, the blower delivering two jets of compressed air that are substantially perpendicular to each other, each mail item being displaced between the two jets of air. With this arrangement, the mail item is guided from its exit from the injection system along the second side walls of a receptacle of the carousel until it reaches the end wall of the receptacle.

In a particular embodiment of the sorting machine of the invention, a flexible deflector is fixed on a first one of the side walls of each receptacle in such a manner that each mail item injected into the receptacle is guided towards the end wall while being pressed substantially against the second side wall. With this arrangement, mail items are guided and held in the receptacles and they do not sag.

The sorting machine of the invention may also present the following features:

the flexible deflector is a wide strip of belt reinforced with cloth;

each jet of compressed air is a flat jet of compressed air delivered by means of one or more flat nozzles; and the pressure of the jets of compressed air lies in the range 0.5 bars to 1.5 bars (depending on the type of blower).

BRIEF DESCRIPTION OF THE DRAWINGS

An embodiment of a postal sorting machine of the invention is described below in detail and is shown in the drawings.

FIG. 1 is a highly diagrammatic plan view of a carousel and a system for injecting mail items.

FIG. 2 is a diagrammatic plan view of the zone where mail items are injected into a carousel of a sorting machine of the invention.

FIG. 3 is a diagrammatic side view of a receptacle provided with a deflector in a sorting machine of the invention.

FIG. 4 is a diagrammatic side view showing the arrangement of blowers in a sorting machine of the invention.

DETAILED DESCRIPTION OF THE INVENTION

FIG. 1 shows an intermediate carousel 1 in a postal sorting machine (not shown), the carousel being provided with receptacles 2 and serving to transfer mail items coming from an inlet conveyor to a sorting conveyor (conveyors not shown). To perform the transfer, the mail items 3 traveling while standing on edge are sent by means of an injection system 4 into the open receptacles 2, each being formed by two side walls 5 and 6 and an end wall 7 opposite from the position of the injection system 4.

The injection system 4 is made up of two rows of elastically deformable wheels 8 that enable the mail items 3 to be slowed down in order to limit the magnitude of the impacts of the mail items 3 against the walls, on being injected into the receptacles 2, and enabling the injection of mail items 3 into the carousel to be controlled and synchronized. The rows of wheels 8 comprise two superposed levels of wheels. The end wall 7 is mounted on a shock absorber 9 for damping the impact of a mail item 3 sent at high speed into the receptacle 2, thereby avoiding damage to the item. The injection system 4 is described in detail in patent document FR-2 795 396.

The receptacles 2 of the carousel 1 move and turn in the direction represented by arrows 10. The mail items 3 standing on edge between the walls 5 and 6 of the receptacles 2 slide while advancing with the receptacles 2 until they reach an opening in the baseplate into which they drop vertically, under gravity, into slots of the sorting conveyor, where the sorting conveyor (not shown) is arranged beneath the carousel 1. In order to drop properly into the slots of the sorting conveyor, it is necessary for the mail items 3 previously to be standing in a vertical position, on edge in the receptacles 2.

As shown in FIG. 1, the carousel 1 follows a closed path of oval shape. The spacing between the walls 5, 6 of a receptacle is greater in the curved portion than is the spacing between them in the straight portion of the path. As a result air becomes compressed and there are disturbances in the air on leaving the curved portion, at the location where the injection system 4 is located (at the exit from a curved portion).

In the description below, the side wall 5 whose back faces in the forward direction of the carousel 1 is referred to as being the "first" side wall 5, whereas the side wall facing it is referred to as being the "second" side wall 6.

FIG. 2 is a diagram showing the zone in which mail items 3 are injected into the carousel 1 of a sorting machine of the invention. The system 4 for injecting mail items 3 as described above sends the mail items 3 towards the carousel 1 in a longitudinal direction that is perpendicular to the movement represented by arrow 10, with the items passing into the receptacles 2 of the carousel 1 in the injection zone. The receptacles 2 of the carousel 1 are all arranged in the same manner. In the injection zone, the side walls 5, 6 of the receptacles 2 are substantially parallel with said longitudinal direction and perpendicular to the end wall 7.

The first side wall 1 has a rearwardly open rounded portion 11 at the entrance to the receptacle 2 and. covered in a slippery plastic material for the purpose of guiding the mail items 3 towards the end of the receptacle 2 in the event of the trajectory of the mail items 3 being deflected so that they are not sent to the center of the receptacle 2 but strike into abutment against the rounded portion 11.

As shown in FIG. 2, a flexible deflector 12 is secured to the first side wall 5. By way of example, the flexible deflector 12 can be constituted by a broad flat belt or by a broad strip of rubber reinforced with cloth (or carpet) and disposed between the end wall 7 and the rounded portion 11 and advancing within the receptacle 2.

In FIG. 3, it can be seen that adding the flexible deflector 12 in the receptacle 2 serves to restrict the spacing between the two side walls 5 and 6 over the full height of the receptacle 2, which spacing was 70 mm. The spacing between the flexible deflector 12 and the second side wall 6 is no more than about 25 mm. The flexible deflector 12 thus enables the items 3 to be guided towards the end wall 7 while remaining pressed substantially against the second side wall 6, but above all and as can be seen in FIG. 3, it serves to keep flexible or not very rigid mail items 3 vertical over their full height by being pressed substantially against the second side wall 6, and it also serves to guide their dropping into the sorting conveyor (not shown). Flexible mail items 3 take up a wavy shape between the deflector 12 and the second side wall 6, but they do not sag.

Because the deflector 12 is flexible, items 3 that are rigid and/or thick are not prevented from passing between the second side wall 6 and the deflector 12. In addition, the flexible deflector 12 can flatten and does not jam thick items of mail 3, so it does not interfere with them dropping into the slots of the sorting conveyor (not shown).

Integrating a flexible deflector 12 into each receptacle 2 of the carousel 1 is easy and inexpensive.

In FIG. 2, it can also be seen in the injection zone that a blower 13 is interposed between the injection system 4 and the carousel 1. The blower 13 delivers two flat jets 14 and 15 of compressed air that are substantially perpendicular to each other or that present a slightly obtuse angle between each other and that are delivered by means of flat nozzles 16 and 17.

A jet 14 applied along said longitudinal direction towards the carousel 1 between the mail item 3 and the corresponding second side wall 6 of the receptacle 2 serves to deflect the trajectories of flexible mail items 3 towards the second wall 6 by the Venturi effect. Under the effect of this jet 14 of compressed air, the mail item 3 is attracted towards the second side wall 6 and is then pushed along the wall to the end wall 7. The trajectory of the mail item 3 is represented by a dashed line arrow 18 in FIG. 2. A reference plate 19 is placed parallel to the mail item 3 on the side of the mail item 3 that is opposite from its side adjacent to the jet 14, with the plate 19 serving to close the space between the head of the nozzle 16 and the open ends of the receptacle 2, minimizing the distance between the open ends of the receptacles 2 and the head of the nozzle 16 delivering the jet 14 longitudinally, so as to keep the direction of the jet 14 well under control and so as to limit disturbances to the air.

Another jet 15 is applied against the mail item 3 in a direction that is substantially parallel and opposite to the direction of movement of the receptacle 2. The jet 15 then applies pressure against the mail item 3, and more particularly to the rear portion of the mail item 3 after the mail item 3 has been released by the wheels 8 of the injection system 4, thereby deflecting it against the second side wall 6.

As a result, the blower 13 improves guidance of mail items 3 as soon as they leave the injection system 4, and it mitigates the large disturbances to the air that are generated by the movement and the relative closing of the walls 5 and 6 upstream from the injection zone. As a result, the trajectories 18 of mail items 3 that are lightweight and/or flexible are under control and the mail items 3 are properly guided into the receptacles 2.

FIG. 4 is a side view showing the arrangement of the blowers 13 in the sorting machine. The flat jet 15 of compressed air is delivered by one or more flat nozzles 17 against part or all of the height of the receptacle 2. The jet 14 of compressed air is delivered by a flat nozzle 16 against the central portion of the receptacle 2 since the flat nozzle is inserted between the two superposed levels of wheels 8. For this purpose, it is possible to use one or more flat nozzles 16, 17 in alignment, e.g. of the "727ABS" type from the supplier "Windjet" or of the "921" type from the supplier "Silvent".

The jets 14, 15 of compressed air are applied in continuous manner so long as the carousel 1 is moving. It is possible to apply air jet pressures lying in the range 0.5 bars to 1.5 bars, but it is preferable to use a pressure of 1 bar as determined by testing and producing an optimum effect of causing the mail items 3 to adhere against the second walls 6 of the receptacles 2.

In "TOP 2000" type postal sorting machines, the spacing between the injection system 4 and the carousel 1 is sufficient for the blower 13 to be integrated therein.

The deflectors 12 and the blower 13 can be arranged individually or simultaneously in the sorting machine of the invention. The combination of the two techniques improves the performance of mail item transfer between the entry conveyor and the sorting conveyor by a factor of better than 30. With this arrangement, the number of items presenting faulty injection into the carousel can be reduced to about 0.06%, thus making it possible to satisfy the present requirements of sorting machine users, and also making it possible to enlarge the range of items that can be processed.

Clearly the invention is not limited in any way to the particular embodiment described, but extends to any variant within the competence of the person skilled in the art for injecting mail items into receptacles.

What is claimed is:

1. A postal sorting machine comprising:
    a carousel (1) having receptacles each being defined by an end wall and two side walls,
    a system for injecting mail items edge on into said receptacles, and
    a blower interposed between the injection system and the carousel, the blower delivering two jets of compressed air that are substantially perpendicular to each other, each mail item being displaced between the two jets of air.

2. The postal sorting machine according to claim 1, in which a flexible defector is fixed on a first one of the side walls of each receptacle in such a manner that each mail item injected into the receptacle is guided towards the end wall while being pressed substantially against the second side wall.

3. The postal sorting machine according to claim 2, in which the flexible deflector is a wide strip of belt reinforced with cloth.

4. The postal sorting machine according to claim 1, in which each jet of compressed air is a flat jet of compressed air delivered by means of one or more flat nozzles.

5. The postal sorting machine according to claim 1, in which the pressure of the jets of compressed air lies in the range 0.5 bars to 1.5 bars.

* * * * *